(12) United States Patent
Tan

(10) Patent No.: US 8,094,768 B2
(45) Date of Patent: Jan. 10, 2012

(54) MULTI-CHANNEL TIMING RECOVERY SYSTEM

(75) Inventor: Yaolong Tan, Jiangsu (CN)

(73) Assignee: Triductor Technology (Suzhou) Inc., Jiangsu Province (CN)

(*) Notice: Subject to any disclaimer, the term of this patent is extended or adjusted under 35 U.S.C. 154(b) by 840 days.

(21) Appl. No.: 12/086,895

(22) PCT Filed: Dec. 21, 2006

(86) PCT No.: PCT/CN2006/003514
§ 371 (c)(1),
(2), (4) Date: Jun. 20, 2008

(87) PCT Pub. No.: WO2007/071193
PCT Pub. Date: Jun. 28, 2007

(65) Prior Publication Data
US 2009/0257540 A1    Oct. 15, 2009

Related U.S. Application Data

(60) Provisional application No. 60/753,616, filed on Dec. 23, 2005.

(51) Int. Cl.
*H04L 7/00* (2006.01)
(52) U.S. Cl. ........ 375/371; 375/373; 375/376; 708/233; 708/552; 708/809; 712/7; 712/8; 712/18; 712/200

(58) Field of Classification Search .................... 712/18, 712/32, 200, 7, 8; 375/371, 373, 376; 708/441, 708/809, 233, 552
See application file for complete search history.

(56) References Cited

U.S. PATENT DOCUMENTS

| 6,363,128 | B1 | 3/2002 | Isaksson et al. | |
| 6,711,598 | B1 * | 3/2004 | Pare et al. | 708/300 |
| 2001/0037443 | A1 * | 11/2001 | Liu | 712/200 |
| 2004/0161055 | A1 * | 8/2004 | Sinha | 375/322 |
| 2005/0165872 | A1 * | 7/2005 | Okada | 708/160 |

FOREIGN PATENT DOCUMENTS

| CN | 1152386 | 6/1997 |
| KR | 20040107607 A | 12/2004 |

* cited by examiner

*Primary Examiner* — Khanh C Tran
*Assistant Examiner* — Rahel Guarino
(74) *Attorney, Agent, or Firm* — Muirhead and Saturnelli, LLC

(57) ABSTRACT

The present invention discloses a novel multi-channel timing recovery scheme that utilizes a shared CORDIC to accurately compute the phase for each tone. Then a hardware-based linear combiner module is used to reconstruct the best phase estimate from multiple phase measurements. The firmware monitors the noise variance for the pilot tones and determines the corresponding weight for each tone to ensure that the minimum phase jitter noise is achieved through the linear combiner. Then a hardware-based second-order timing recovery control loop generates the frequency reference signal for VCXO or DCXO. A single sequentially controlled multiplier is used for all multiplications in the control loop.

17 Claims, 3 Drawing Sheets

_US 8,094,768 B2_

MULTI-CHANNEL TIMING RECOVERY SYSTEM

CROSS-REFERENCE TO RELATED APPLICATION

The present application claims the benefit of provisional application No. 60/753,616 filed Dec. 23, 2005, the content of which is hereby incorporated by reference in its entirety.

FIELD OF THE INVENTION

The present invention relates to a timing recovery system, more particularly to a hardware-based multi-channel timing recovery system with CORDIC processing.

BACKGROUND OF THE INVENTION

Timing recovery is a very important receiver function for DMT-based VDSL2 systems. It is vital to design a good timing recovery system to suppress the jitter noise to a level that is comparable to the receiver noise in the loop. Otherwise, the receiver performance will be limited by the poor timing recovery response. In DMT-based systems, single or multiple frequency tones are used as pilot tones that embed the timing phase signals. The timing recovery module reconstructs the phase information from the pilot tones, which is used as reference to the timing recovery control loop. The timing recovery control loop produces frequency control signal to adjust the local clock frequency correspondingly to match the transmitter system clock. In order to achieve superior performance, it is important to reconstruct high-accurate phase information from the pilot tones.

In VDSL2 systems, timing recovery or clock recovery is always a basic building block. Usually the transceivers at the central office drive the DAC signal out and sample the ADC data at a local crystal oscillator. At the customer premise, the transceiver also drives out the DAC signal and samples ADC signal at a local clock. It is impossible to have the exactly same crystal oscillator frequency on both the central office and the customer premises. Therefore, timing recovery system is utilized at the customer premise to recovery the clock information so that effectively the transceivers on both sides have the same clock frequency.

Timing recovery systems usually consist of the phase detection module and the second-order control loop. From the received signal, the phase detection module retrieves the clock frequency information that is embedded by the transceivers on the central office. The clock frequency information is basically related to the clock frequency difference between the master clock on the central office and the slave clock on the customer premises. The frequency difference is then used to drive the second-order control loop to adjust the slave clock through the voltage-controlled crystal oscillator (VCXO) or digitally-controlled crystal oscillator (DCXO). With the communication channel as a part of the closed-loop system, the frequency difference eventually will be driven to zero which means that the slave clock on the customer premise has the same clock frequency as the master clock on the central office.

The timing recovery system design shall be considered an integrated part of the transceiver communication systems. An over-designed system could waste the system cost including hardware and firmware. An under-designed system could limit the overall system performance. One important factor that affects the timing recovery system performance is the measurement noise. The measurement noise comes primarily from the crosstalk, RF interference, and board AWGN. For a single pilot tone scheme, the performance will significantly deteriorate if the measurement noise on the chosen pilot tone suddenly becomes worse due to new noise source. With single pilot tone scheme, the modem may have to go to retrain in order to choose another pilot tone so that the system performance will not be limited by the clock jitter noise. However, if multiple pilot tones are used, the adaptation scheme running on the hardware or firmware can quickly pick up the affected tone and limit its deteriorating effect by reducing its corresponding weight. Therefore, the performance can be maintained and the modem does not necessarily go to retrain.

On the other hand, the phase estimation itself could affect the system performance. Usually in a DMT-based system, the phase estimation is extracted from the FFT outputs for the selected pilot tones, which are basically complex vector with real and imaginary values. The phase estimation module needs to reconstruct the phase information from those real and imaginary values. How accurate is the phase estimation also significantly affects the overall system performance.

SUMMARY OF THE INVENTION

The present invention defines and implements a novel multi-channel timing recovery scheme that utilizes a shared CORDIC (Coordinate-Rotation Digital Computer) to accurately compute the phase for each tone. Then a hardware-based linear combiner module is used to reconstruct the best phase estimate from multiple phase measurements. The firmware monitors the noise variance for the pilot tones and determines the corresponding weight for each tone to ensure that the minimum phase jitter noise is achieved through the linear combiner. Then a hardware-based second-order timing recovery control loop generates the frequency reference signal for VCXO (Voltage-Controlled Crystal Oscillator) or DCXO (Digitally-Controlled Crystal Oscillator). A single sequentially controlled multiplier is used for all multiplications in the control loop.

In accordance with an embodiment of the invention, a timing recovery system comprises a phase error estimator module for producing a pilot phase error vector for each pilot tone; a CORDIC processing module for computing the exact angle error vector for each pilot tone after it receives the pilot phase error vectors from the phase error estimator module; a linear combiner module for combining all the angle error vectors of multiple pilot tones from the CORDIC processing module and forming a single phase error reference signal; a $2^{nd}$ order control loop for generating control signal that is started after the linear combiner module already combined all the angle errors; and a pipeline stage controller for controlling the flow of the data across the timing recovery system and determines when the data will be passed to the next module and when the next module shall start processing the incoming data; wherein all the multiplication operations in the timing recovery loop are carried out by a sequentially shared single multiplier.

Our focus is VDSL2 application. However, the same technology is applicable to other applications such as WiMAX etc.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE INVENTION

Timing Recovery Hardware Architecture Diagram

Figure 1:
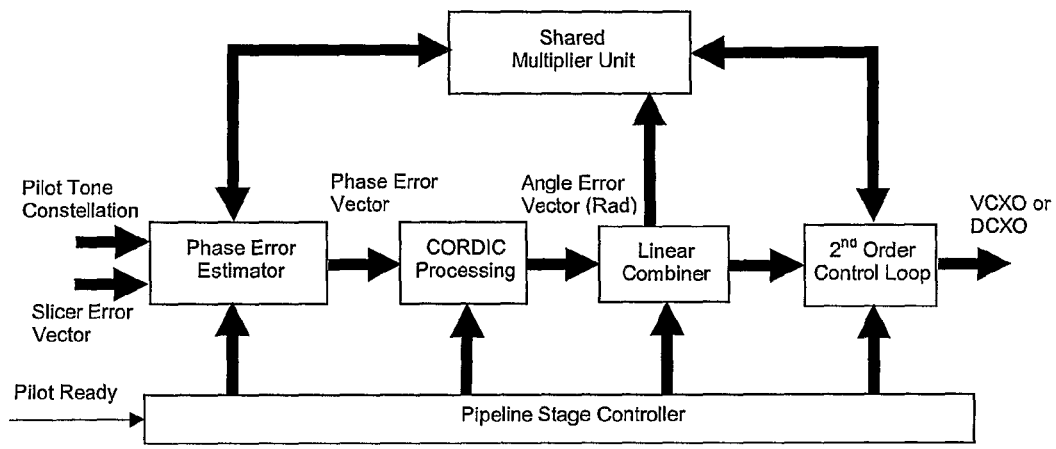
FIG. 1 shows the top functional diagram of our timing recovery system design.

In our timing recovery system design, we carefully identify the boundary between the hardware and firmware to achieve an optimal solution in terms of hardware cost and firmware speed requirement. FIG. 1 shows the top functional diagram of our timing recovery system design. In our design, based on the firmware configuration, two types of data are required. For reference-based pilot recovery, the pilot constellations (complex values in frequency domain after FFT) are needed. For decision-driven pilot recovery, the slice error values (complex values given by slicer in demodulator) are required. The phase error estimator block processes the raw data of either pilot constellations or slice errors to produce the pilot phase error vector. Then the vector is passed to the cordic processing module to generate exact angle error vector in radius. The angle error vector is combined in the linear combiner module to increase the accuracy of phase error estimate. Furthermore, the combine phase error is sent to the second order control loop to generate control signal for VCXO or DCXO control. The above process is controlled by a centralized pipeline stage controller while the shared multiplier unit is used to carry out the arithmetic calculation during the process to reduce the hardware cost. The access to the shared multiplier unit is controlled by the centralized pipeline stage controller.

As we mentioned before, all the multiplication operations in the timing recovery loop are carried out by a shared single multiplier. The reason that we can use a single multiplier is based on the fact that the timing recovery loop bandwidth requirement is much narrower than the actual system clock frequency. VDSL2 uses two symbol rates 4.3125 kHz and 8.625 kHz. For a given system clock such as 141.312 MHz, up to 16384 clock cycles can be used for the share multiplier to support the multiplication processing requirement of the timing recovery modules. On the other hand, the timing recovery is by natural a sequential processing. The second-order control loop can only be started after the linear combiner already combined all the angle errors from the CORDIC processing module. Similarly the CORDIC processing module can only compute the phase angle for each pilot tone after it receives the complex phase error coordinates from the phase error estimator module. So, by sequentially sharing the multiplier across all processing modules in our timing recovery system, we reduce the hardware cost while not incurring any performance effect at all.

The pipeline stage controller determines which input shall be multiplexed into the multiplier and how the output shall be registered by various registers in our timing recovery system to storing intermediate or final results. In addition, the pipeline stage controller controls the flow of the data across the timing recovery system and determines when the data will be passed to the next module and when the next module shall start processing the incoming data etc. Effectively it carries the coordination for the whole timing recovery system.

Phase Error Estimator Module

The hardware-based phase error estimator is the first processing module in our timing recovery system and it computes the phase error from the pilot tone constellations (in pilot-directed mode) or the pilot tone slicer outputs (in data-directed mode with no explicit pilot tone). The phase error estimate module is configurable to support both the initial acquisition stage and the tracking stage that follows. During the initial acquisition stage, a single-frequency sinusoid is transmitted on each pilot tone. The receiver needs to reconstruct the phase different between two consecutive symbols, which is effectively the phase error caused by the timing clock difference. In the pilot-directed mode, it is done by multiplying the conjugate of the current FFT tone output with the previous FFT tone output as in the following formula:

$$\begin{aligned} D_{p,k} &= C_{p,k}^* \times C_{p,k-1} \\ &= (R_{p,k} - jI_{p,k}) \times (R_{p,k-1} + jI_{p,k-1}) \\ &= R_{p,k}R_{p,k-1} + I_{p,k}I_{p,k-1} + j(R_{p,k}I_{p,k-1} - I_{p,k}R_{p,k-1}) \\ &= DR_{p,k} + jDI_{p,k}, \end{aligned}$$

where p is the pilot index, k is the symbol index, $C_{p,k}$ is the pilot tone constellation in frequency domain. We can see that four multiplications are needed for each pilot tone.

In general, during the initial acquisition stage, the VDSL2 CO modems will transmit repetitive pilot-bearer symbols for the VDSL2 CPE modem to recover the master clock frequency used at the central office. After the initial acquisition stage, the slave clock frequency will converge to the master clock frequency so that rest of the training process can be carried out with timing locked. During the showtime (VDSL2 modems start to transmit normal data), two alternative timing tracking methods can be used. One is the pilot-directed, which is the same as in the acquisition stage and dedicated pilot tones are used to carry pilot signals, not the data. The second method is the decision-directed, where no dedicated pilot tones are used and instead the phase information is retrieved from the data bearing tones.

Figure 2:
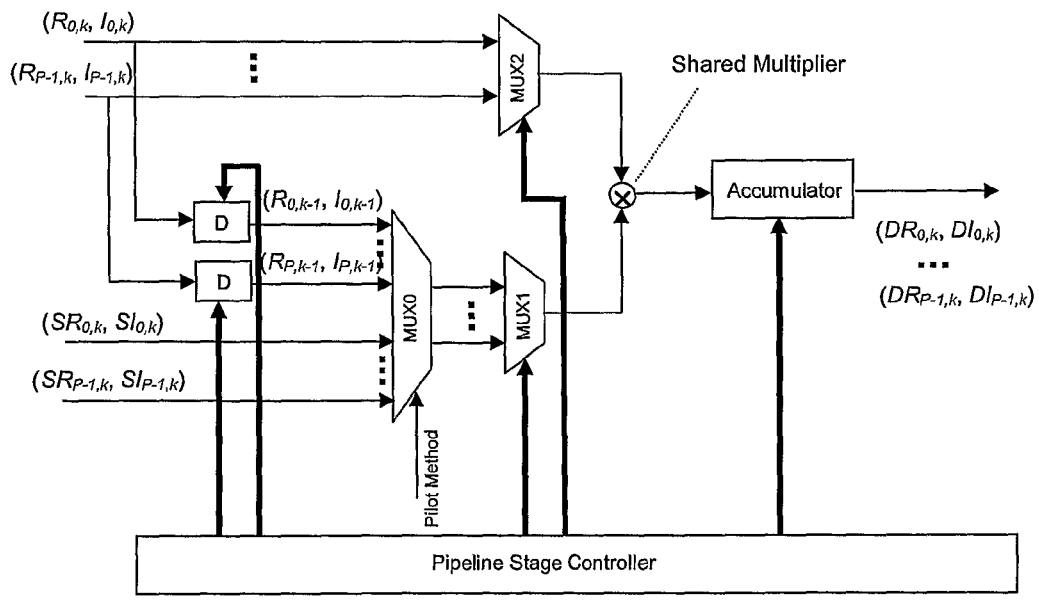
FIG. 2 shows the hardware architecture for the phase error estimator module.

In the decision-directed method, the angle between the sliced constellation and the raw constellation is treated as the phase error reference for the timing recovery loop as shown in the following formula:

$$\begin{aligned} D_{p,k} &= C_{p,k}^* \times S_{p,k} \\ &= (R_{p,k} - jI_{p,k}) \times (SR_{p,k} + jSI_{p,k}) \\ &= R_{p,k}SR_{p,k} + I_{p,k}SI_{p,k} + j(R_{p,k}SI_{p,k} - I_{p,k}SR_{p,k}) \\ &= DR_{p,k} + jDI_{p,k}, \end{aligned}$$

where $S_{p,k}=SR_{p,k}+jSI_{p,k}$ is the sliced constellation output from the slicer logic. The decision-directed method requires that most of the slicer decisions are correct so that there is no error propagation. In practice, usually the SNR margin is raised on the pilot tones in the decision-directed method so that lower constellation is actually loaded to reduce probability of error for the pilot tones. This ensures the stability of the decision-directed method. Our phase error estimator hardware is designed to handle both methods with a simple configuration flag to indicate which method is currently used. It can be configured by the firmware in the field based on the link requirement. In addition, the pilot tone indices are also configurable by the firmware. FIG. 2 shows the hardware architecture for the phase error estimator module. Based on the chosen timing recovery method (reference-based and decision-driven) and the pipeline control signal, all the pilot signals ($R_{p,k}$, $I_{p,k}$) and ($SR_{p,k}$, $SI_{p,k}$) are multiplexed into shared multiplier and accumulator to calculate ($DR_{p,k}$, $DI_{p,k}$).

We assume that the receiver can support up to P pilot tones ($R_{p,k}$, $I_{p,k}$), p=0, 1, ..., P-1. A pilot method register is used by the firmware to configure which method is used in the timing recovery system, the pilot-directed or the decision-directed. Based on the selected pilot method, either the slicer output ($SR_{p,k}$, $SI_{p,k}$), p=0, 1, ..., P-1 or the registered previous pilot constellation ($R_{p,k-1}$, $I_{p,k-1}$), p=0, 1, ..., P is used in the phase error calculation, as shown by the mux0 unit in the figure. The current pilot constellations are latched to the previous constellation registers of ($R_{p,k-1}$, $I_{p,k-1}$) by the sequence control logics at the end of computation for each frame, which is shown by the delay unit D. Furthermore, the pipeline stage controller multiplexes the data for each pilot tone to the shared multiplier through the mux1 and mux2 in a sequential order.

CORDIC Processing

The phase error estimator module produces the phase error for each pilot tone, which is basically a complex coordinate. Next step is to extract the angle information from the complex coordinate, which is implemented in hardware with the CORDIC processing module. CORDIC stands for coordinate-rotation digital computer. With proper configuration, the CORDIC algorithm can calculate the trigonometric phase with any desired precision. Compared with the table-lookup and power-series expansion, our CORDIC processing based angle estimator reduces the hardware cost in terms of gate count since the CORDIC only uses shifts and adders to calculate the phase rather than multipliers and registers. Although CORDIC algorithm is a general algorithm, we are the first in time to propose this unique hardware approach to combine the CORDIC with VDSL2 timing recovery systems seamlessly.

Figure 3:
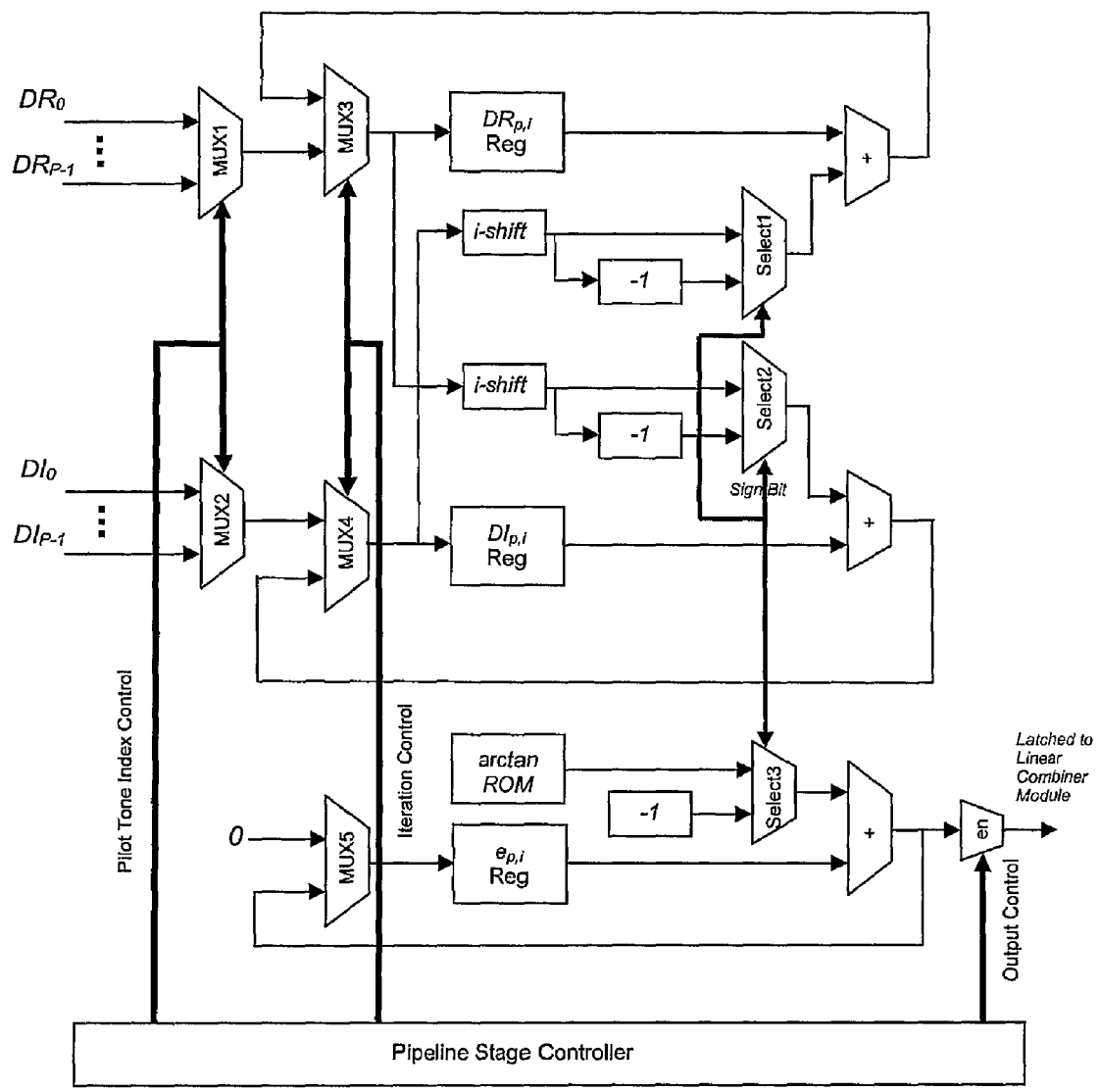
FIG. 3 shows the CORDIC processing diagram.

For a given complex coordinate $D_p = DR_p + jDI_p$ (for simplicity, we ignore the symbol index k), we use the CORDIC processing to compute the phase angle $e_p = \tan^{-1}(DI_p/DR_p)$, which is effectively an iterative approach and is shown in the following equations:

$$S_i = \begin{cases} 1 & DI_{p,i} < 0 \\ -1 & DI_{p,i} \geq 0 \end{cases}$$

$$DR_{p,i+1} = DR_{p,i} - DI_{p,i} \times S_i \times 2^{-i}$$

$$DI_{p,i+1} = DI_{p,i} + DR_{p,i} \times S_i \times 2^{-i}$$

$$e_{p,i+1} = e_{p,i} - S_i \times \arctan(2^{-i})$$

where i is the iteration index and starts with 0, $DR_{p,0} = DR_p$, $DI_{p,0} = DI_p$, and $e_{p,0} = 0$. In general, number of iteration will determine the angle accuracy. More iteration will produce an angular estimate with higher precision. Based on our accuracy requirement of the overall VDSL2 system, we limit the number of iteration to 14. However, our proposed architecture can be used for any degree of iteration to improve the accuracy further. FIG. 3 shows the CORDIC processing diagram. The pilot errors are shifted into the CORDIC processing module one by one through the pilot tone index control signal issued by the pipeline stage controller. Then the pipeline stage controller starts an iteration process for the clocked-in pilot tone error. At the beginning of the iteration, the phase angle register $e_{p,i}$ is initialized to zero, the $DR_{p,i}$ register is initialized to $DR_p$, the $DI_{p,i}$ register is initialized to $DI_p$. After the initialization, the normal iteration process starts. The sign of the $DI_{p,i}$ is used to choose if or not the output of the shift operations of $DI_{p,i}$ and $DR_{p,i}$ need to be negated. The i-shift unit will increase the number of shifts by one after each iteration. On the other hand, the phase angle register $e_{p,i}$ will accumulate the output of the arctan ROM table of $\arctan(2^{-i})$ while the subtract or addition is determined by the sign bit of the $DI_{p,i}$ register. After N-th iteration (in our design, N=14), the phase angle register $e_{p,i}$ will be clocked out to the next liner combiner module.

Linear Combiner

The linear combiner module basically combines the phase angle errors of multiple pilot tones and forms a single phase error reference signal for the second-order control loop. Different weights are assigned to different pilot tones based on the noise property. The less the noise on the pilot tone, the higher is the associated weight for combination. Assume that the phase angle error measurement for each pilot tone is $e_i$, i=0, 1, ..., P and their corresponding frequency bins are $f_i$; i=0, 1, ..., P. In addition, we assume that the measurement noise variance for the phase error angle $e_i$, i=0, 1, ..., P is $\sigma_i^2$, i=0, 1, ..., P. The measurement noise on the phase error angle comes from multiple noise sources that include near-end and far-end crosstalk noise, self-echo noise, AWGC, RFI etc. In practical implementation, we can estimate the total effect of all these noise sources with some simple measurement during the training and showtime. For example, before the slave clock is locked to the master clock, we can fix the slave clock and then obtain the measurement noise variance from differentiating the pilot tone phase angles across continuous DMT symbols. After the slave clock and the master clock are locked, the noise variance can be obtained by comparing it with the desired pilot tone phase. In our implementation, the noise variance measurement is conducted in the firmware. During the showtime, the firmware will consistently monitor the noise variance on each configured pilot tones and adapt the weights if the noise condition has changed. Furthermore, the firmware computes the best unbiased phase angle error estimate with minimum measurement variance as the following:

$$e_{opt} = \sum_{i=0}^{P-1} w_i e_i,$$

where $$w_i = \frac{f_k^2 \sigma_i^{-2}}{\sum_{k=0}^{P-1} f_k^2 \sigma_k^2}.$$

The combination process of $e_{opt}$ is carried out by the hardware while the weight computation and adaptation is carried out by the firmware.

The reason to split the firmware and hardware with such a way is based on the system consideration. The timing recovery process needs to be carried out every DMT frame to track the clock jitter. However, the weight coefficients do not need to be modified very often and are based on the channel noise condition that intends to change very slowly. Therefore, our hardware and firmware separation releases the microprocessor from frame-by-frame computation while only running the intelligent operations such as pilot tone noise monitoring and weight adaptation. Those intelligent operations do not require real-time capability on the firmware itself. This will enable the microprocessor to support more ports or to reduce microprocessor speed for less power.

Figure 4:
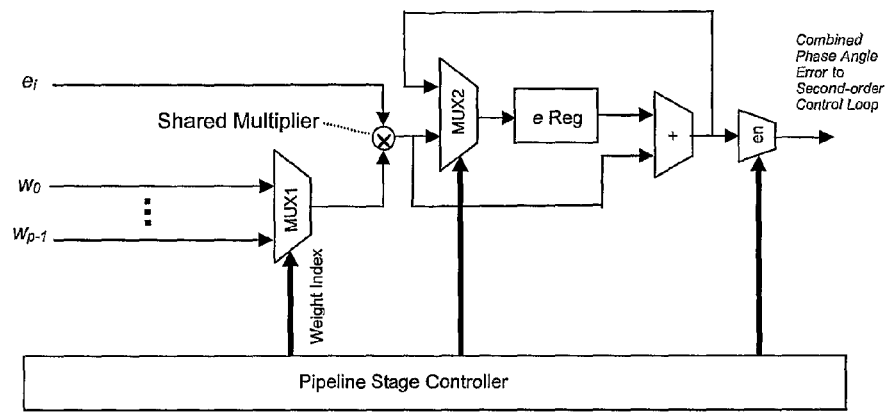
FIG. 4 shows the hardware architecture of the linear combiner module.

FIG. 4 shows the hardware architecture of the linear combiner module. The phase angle error for each pilot tone is pushed into the linear combiner module sequentially. The pipeline stage controller identifies the corresponding weight coefficient and generates weight index signal to control the multiplex unit. The shared multiplier is used to compute $e_i w_i$ while the pipe state controller controls the multiplex unit to either directly latch the $e_0 w_0$ to the e register or latch the addition of the previous accumulation value and the current $e_i w_i$. The final phase angle error e will be shifted out by the pipeline stage controller after all the pilot angle errors are passed through.

Second-Order Control Loop

The second-order control is the feedback control system that actually produces the VCXO or DCXO control signal from the phase angle error to adjust the slave clock frequency. We use a PI-type second-order system. "P" stands for proportional and "I" stands for integral. In order to achieve superior tracking performance during initial tracking stage, we introduce an anti-windup mechanism into the integral portion to limit the error integration in the loop. In a floating-point implementation, our second-order control loop is as the following:

Integration:

$$I(n)=I(n-1)+k_i e(n),$$

Anti-Windup:

$$I_{sat}(n) = \begin{cases} R_{vco}, & \text{if } I(n) > R_{vco}, \\ -R_{vco}, & \text{if } I(n) < -R_{vco}, \\ I(n), & \text{Otherwise,} \end{cases}$$

Controller:

$$u(n)=k_p e(n)+I_{sat}(n),$$

Output Saturation:

$$u_{sat}(n) = \begin{cases} R_{vco}, & \text{if } u(n) > R_{vco}, \\ -R_{vco}, & \text{if } u(n) < -R_{vco}, \\ u(n), & \text{Otherwise,} \end{cases}$$

where $k_p$ is the floating-point proportional gain and $k_i$ is the floating-point integral gain. During different tracking phases, they can be chosen from two sets of PI controller parameters: ($k_{pf}$, $k_{if}$) for fast convergence and ($k_{po}$, $k_{io}$) for performance optimization. The steady-state values $R_{vco}$ of $I_{sat}(n)$ and u(n) depends on the maximum frequency difference between the master and slave clocks.

However, different strategies need to be explored if the implementation is actually done in a fixed-point environment, which is the case in our second-order control implementation. As we mentioned, our second-order control system is realized in the hardware and it is not cost-efficient to use a floating-point implementation. The key point in the fixed-point implementation is to properly scale the input signal, the internal signals, and the output signal to a relative level. In our implementation, the scaling is economically done through shift operation. The following equations show our fixed-point second-order control loop implementation:

Input Scaling:

$$e_s(n)=2^{SIN}e(n)$$

Integration:

$$I(n)=I(n-1)+k_i e_s(n),$$

Anti-Windup:

$$I_{sat}(n) = \begin{cases} R_{vco}, & \text{if } I(n) > R_{vco}, \\ -R_{vco}, & \text{if } I(n) < -R_{vco}, \\ I(n), & \text{Otherwise,} \end{cases}$$

Integral Scaling:

$$I_s(n)=2^{SI}I_{sat}(n)$$

Controller:

$$u(n)=k_p e_s(n)+I_s(n),$$

Output Scaling:

$$u_s(n)=2^{SOUT}u(n)$$

Output Saturation:

$$u_{sat}(n) = \begin{cases} R_{vco}, & \text{if } u(n) > R_{vco}, \\ -R_{vco}, & \text{if } u(n) < -R_{vco}, \\ u_s(n), & \text{Otherwise,} \end{cases}$$

Figure 5:
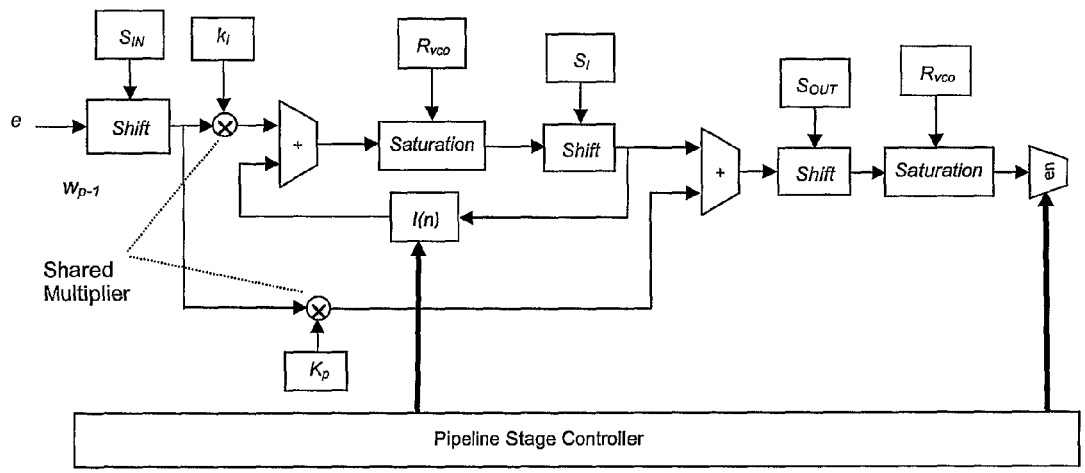
FIG. 5 shows the hardware architecture for the timing-recovery second-order control loop.

FIG. 5 shows the hardware architecture for the timing-recovery second-order control loop.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A timing recovery system, comprising:
a phase error estimator module for producing a pilot phase error vector for each pilot tone;
a CORDIC processing module for computing an exact angle error vector for each pilot tone after it receives the pilot phase error vectors from the phase error estimator module;
a linear combiner module for combining all the angle error vectors of multiple pilot tones from the CORDIC processing module and forming a single phase error reference signal;
a 2nd order control loop for generating control signal that is started after the linear combiner module already combined all the angle errors; and
a pipeline stage controller for controlling a flow of data across the timing recovery system and determines when the data will be passed to the next module and when the next module shall start processing the incoming data;
wherein all multiplication operations in the timing recovery loop are carried out by a sequentially shared single multiplier.

2. The system of claim 1, wherein the pipeline stage controller also determines which input shall be multiplexed into the multiplier and how the output shall be registered by various registers in the timing recovery system to store intermediate or final results.

3. The system of claim 1, wherein the phase error estimator module computes the phase error from the pilot tone constellations for the pilot-directed mode or the pilot tone slice error values for the decision-directed mode.

4. The system of claim 3, wherein a pilot method register is used by the firmware to configure which method is used in the timing recovery system, the pilot-directed or the decision-directed.

5. The system of claim 4, wherein, based on the selected pilot method, either the slicer output (SRp,k, SIp,k) or the registered previous pilot constellation (Rp,k−1, Ip,k−1) is used in the phase error calculation (the mux0 unit); the current pilot constellations are latched to the previous constellation registers of (Rp,k−1, Ip,k−1) by the sequence control logics at the end of computation for each frame (the delay unit D); and the pipeline stage controller multiplexes the data for each pilot tone to the shared multiplier through two MUXs in a sequential order.

6. The system of claim 1, wherein CORDIC only uses shifts and adders to calculate the phase angles.

7. The system of claim 6, wherein, for a given complex coordinate $D_p = DR_p + jDI_p$, the CORDIC processing module computing the phase angle as $e_p = \tan^{-1}(DI_p/DR_p)$, which is shown in the following equations:

$$S_i = \begin{cases} 1 & DI_{p,i} < 0 \\ -1 & DI_{p,i} \geq 0 \end{cases}$$

$$DR_{p,i+1} = DR_{p,i} - DI_{p,i} \times S_i \times 2^{-i}$$

$$DI_{p,i+1} = DI_{p,i} + DR_{p,i} \times S_i \times 2^{-i}$$

$$e_{p,i+1} = e_{p,i} - S_i \times \arctan(2^{-i})$$

where i is the iteration index and starts with 0, DRp,0=DRp, DIp,0=DIp, ep,0=0.

8. The system of claim 7, wherein the CORDIC processing module computing the phase angle by:
the pilot errors are shifted into the CORDIC processing module one by one through the pilot tone index control signal issued by the pipeline stage controller;
the pipeline stage controller starts an iteration process for the clocked-in pilot tone error;
wherein at the beginning of the iteration, the phase angle register ep,i is initialized to zero, the DRp,i register is initialized to DRp, the DIp,i register is initialized to DIp;
after the initialization, the normal iteration process starts; and the sign of the DIp,i is used to choose if or not the output of the shift operations of DIp,i and DRp,I need to be negated;
the number of shifts is increased by one after each iteration (the i-shift unit);
the output of the arctan ROM table of $\arctan(2^{-i})$ is accumulated by the phase angle register ep,i while the subtract or addition is determined by the sign bit of the DIp,i register.

9. The system of claim 8, after N-th iteration, the phase angle register ep,i being clocked out to the next liner combiner module.

10. The system of claim 9, the number of iteration is determined based on the accuracy requirement of the overall VDSL2 system.

11. The system of claim 10, wherein the number of iteration N is 14.

12. The system of claim 1, wherein the linear combiner module combines all the phase angle errors by:
the phase angle error for each pilot tone is pushed into the linear combiner module sequentially;
the pipeline stage controller identifies the corresponding weight coefficient and generates weight index signal to control the multiplex unit;
the shared multiplier is used to compute $e_i w_i$ while the pipe state controller controls the multiplex unit to either directly latch the $e_0 w_0$ to the e register or latch the addition of the previous accumulation value and the current $e_i w_i$.

13. The system of claim 12, the final phase angle error e is to be shifted out by the pipeline stage controller after all the pilot angle errors are passed through.

14. The system of claim 12, wherein the firmware computes the best unbiased chase angle error estimate with minimum measurement variance as the following:

$$e_{opt} = \sum_{i=0}^{P-1} w_i e_i,$$

where $$w_i = \frac{f_k^2 \sigma_i^{-2}}{\sum_{k=0}^{P-1} f_k^2 \sigma_k^{-2}};$$

wherein the combination process of $e_{opt}$ is carried out by the hardware while the weight computation and adaptation is carried out by the firmware.

15. The system of claim 1, wherein the 2nd order control loop is a fixed-point second-order control loop.

16. The system of claim 15, wherein the scaling is done through shift operation.

17. The system of claim 15, wherein the fixed-point second-order control loop implementation is as follows:

Input Scaling:

$$e_s(n) = 2^{S_{IN}} e(n)$$

Integration:

$$I(n) = I(n-1) + k_i e_s(n),$$

Anti-Windup:

$$I_{sat}(n) = \{R_{vco}, \text{ if } I(n) > R_{vco},$$

$$-R_{vco}, \text{ if } I(n) < -R_{vco},$$

$$I(n), \text{ Otherwise},$$

Integral Scaling:

$$I_s(n) = 2^{S_I} I_{sat}(n)$$

Controller:

$$u(n) = k_p e_s(n) + I_s(n),$$

Output Scaling:

$$u_s(n) = 2^{S_{OUT}} u(n)$$

Output Saturation:

$u_{sat}(n) = \{R_{vco}, \text{ if } u(n) > R_{vco},$ $-R_{vco}, \text{ if } u(n) < -R_{vco},$ $u_s(n), \text{ if } -R_{vco} <= u_s(n) <= R_{vco}.$

* * * * *